United States Patent [19]

Long

[11] 4,028,959
[45] June 14, 1977

[54] STRAIGHT ACTION GEAR CHANGING MECHANISM

[76] Inventor: Leonard Clarence Long, R.D. No. 2, Annville, Pa. 17003

[22] Filed: June 25, 1976

[21] Appl. No.: 699,800

[52] U.S. Cl. .................................. 74/473 R; 74/491
[51] Int. Cl.² ......................................... G05G 9/08
[58] Field of Search ............. 74/337.5, 473 R, 474, 74/475, 476, 477, 491

[56] References Cited

UNITED STATES PATENTS

| | | | |
|---|---|---|---|
| 2,961,890 | 11/1960 | Marshall | 74/477 |
| 3,018,670 | 1/1962 | Lohn | 74/473 X |
| 3,461,739 | 8/1969 | Viegas | 74/337.5 X |
| 3,636,793 | 1/1972 | Bieber | 74/473 R |

*Primary Examiner*—Allen D. Herrmann
*Attorney, Agent, or Firm*—Frederick W. Raring

[57] ABSTRACT

Gear changing mechanism comprises spaced-apart camming plates and three gear changing levers mounted on a common axis which extends between the camming plates. The levers have control arm portions which have slots to receive a camming pin by means of which the levers are selectively oscillated with respect to the common axis. Camming means on the camming plates controls the movement of the camming pin to determine which lever will be oscillated by the camming pin. The camming pin, in turn, is controlled by a gear shift lever to which the camming pin is linked.

9 Claims, 6 Drawing Figures

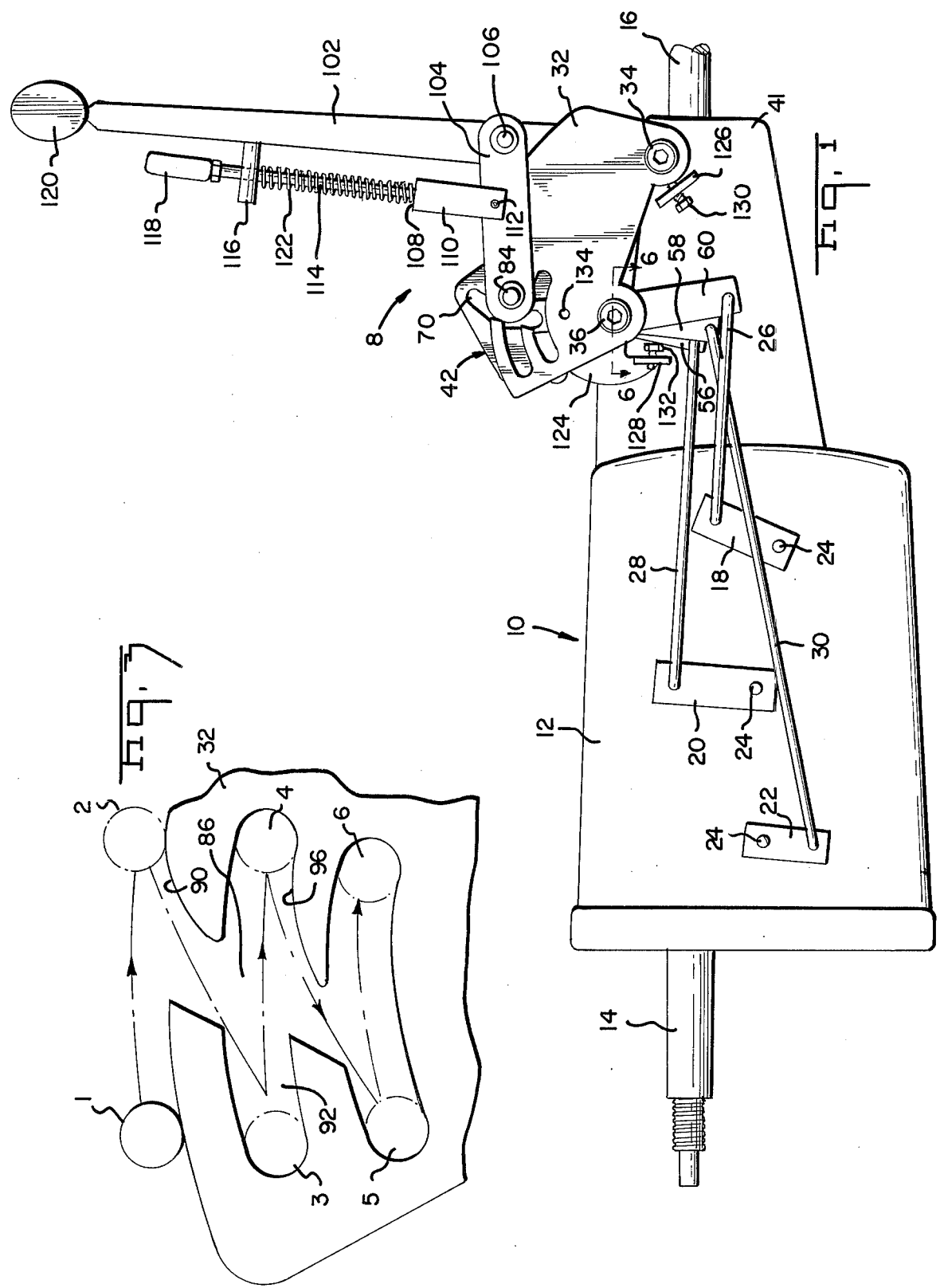

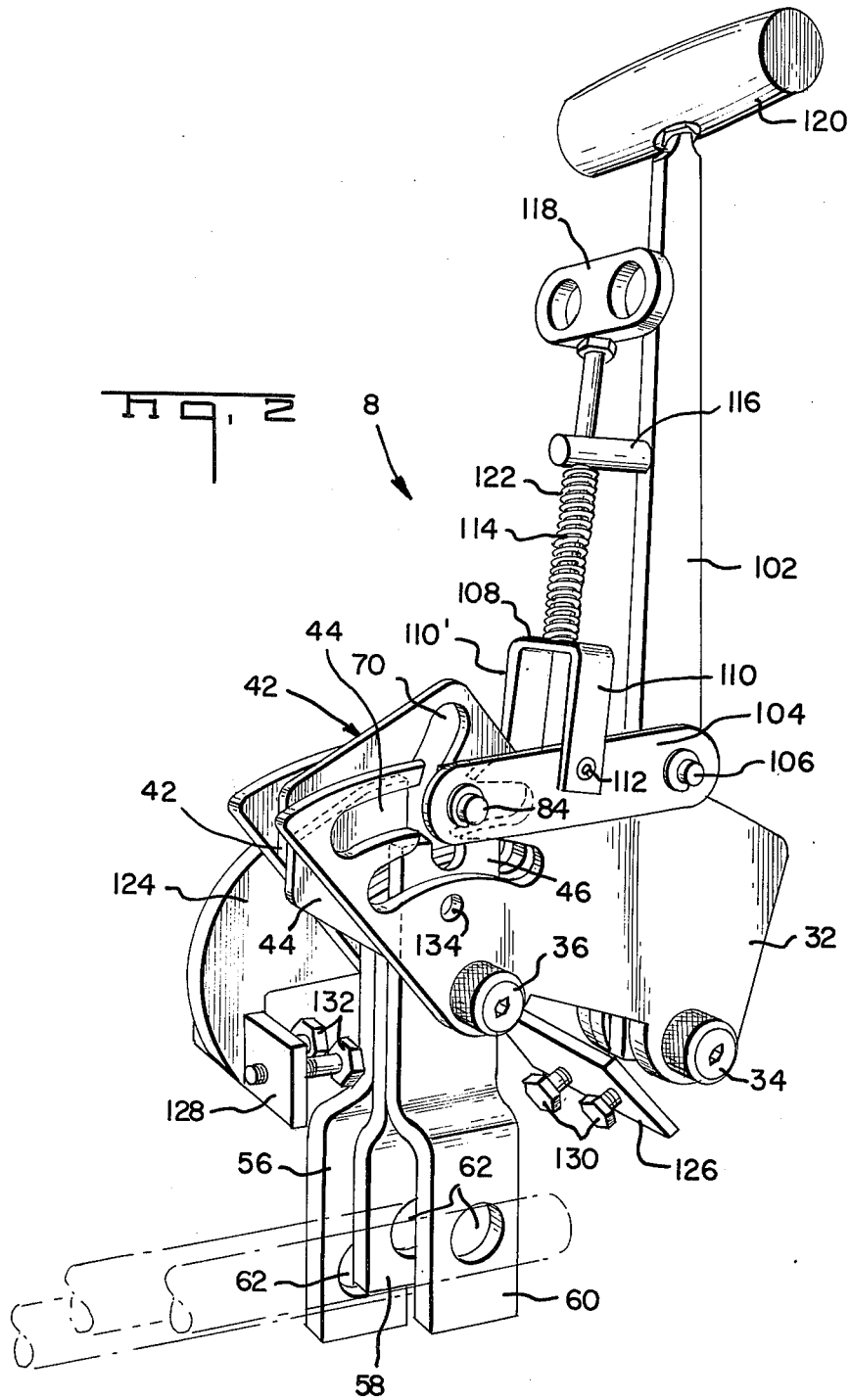

STRAIGHT ACTION GEAR CHANGING MECHANISM

BACKGROUND OF THE INVENTION

This invention relates to gear shifting mechanisms of the type in which gear ratio changes are brought about by back and forth movement of the gear shift lever. A gear shift mechanism of this general class is disclosed in U.S. Pat. No. 3,636,739. The instant invention is directed to the achievement of a shifting mechanism having capabilities which permit its use with five-speed transmissions and to other improvements. The embodiment of the invention disclosed herein is particularly intended for use on competitive type vehicles used for high acceleration racing events or drag races. The principles of the invention can be used also on vehicles intended for over the road service.

Drag racing has for its object the achievement of an extremely high speed in a very short distance by the vehicle. For example, it is common for a drag racing vehicle to achieve a speed of 140 or more miles per hour in less than 10 seconds on a course of one-fourth mile. Racing vehicles are equiped with manual transmissions having four speed or five speeds and the driver must, therefore, change gears 3 or 4 times during the extremely short time period of the race. Obviously, then it is critical that the gears be changed almost instantaneously. The back and forth gear changing mechanism of the above-identified U.S. patent is highly regarded for the reason that gears are changed by a simple straight motion of the gear shift lever rather than a motion which follows an H pattern, however, as noted above, this mechanism is intended for use in a four speed transmission.

Many of the transmissions used in racing events have five forward speeds and the need for a straight action five speed changing mechanism has been recognized for some time. The instant invention has this capability as well as a degree of versatility which permits its use with a four speed transmission.

It is accordingly an object of the invention to provide an improved gear changing mechanism for a manual automotive transmission. A further object is to provide a mechanism for use in competitive acceleration racing. A further object is to provide a durable and rugged speed changing mechanism which will withstand the conditions of competition acceleration racing events. A further object is to provide a straight action gear changing mechanism which can be used with a four speed transmission and with a five speed transmission.

These and other objects of the invention are achieved in a preferred embodiment thereof which is briefly described in the foregoing abstract, which is described in detail below and which is shown in the accompanying drawing in which:

FIG. 1 is a side view of a gear changing mechanism in accordance with the invention mounted on a vehicle transmission.

FIG. 2 is a perspective view of the gear changing mechanism of the invention.

FIG. 3 is a side view of one of the camming plates which forms part of the invention, this view illustrating positions of the camming pin in its several positions required for different gear ratios.

Figure 4:
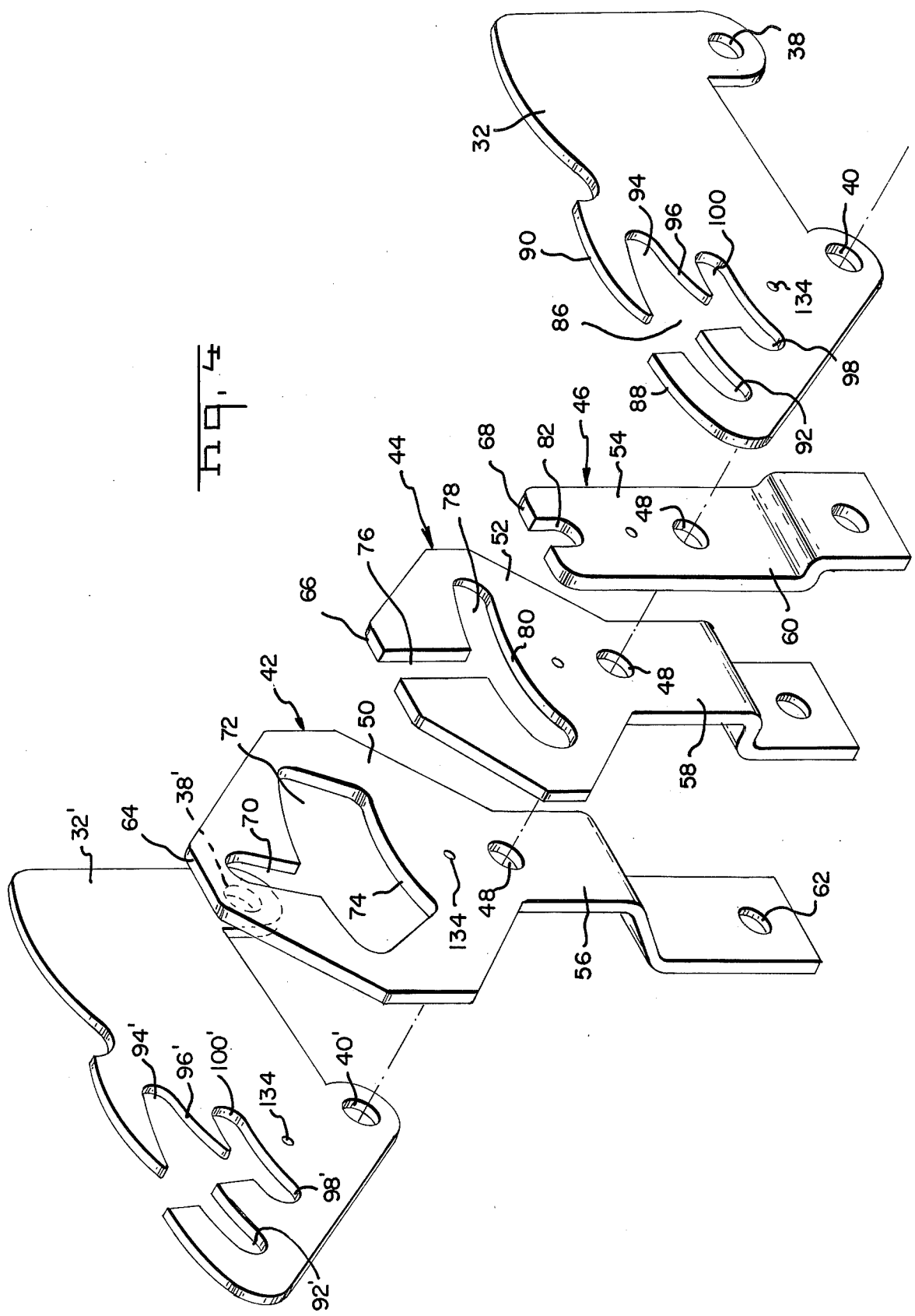
FIG. 4 is a perspective exploded view of the camming plates and the control levers of the mechanism.

The herein disclosed embodiment of the invention comprises a gear shifting mechanism 8 which is adapted to be used with a manuel type automotive transmission 10 having a housing 12, an input shaft 14, and an output shaft 16. When the invention is used for racing events the transmission 10 will usually be of a type particularly intended for racing rather than for street use. For example, a transmission manufactured by Doug Nash Equipment and Engineering Cork, 36360 Ecorse Road, Romulus, Mich. is widely used in drag-type racing competition. This transmission can be used as a four speed or a five speed transmission and the shifting mechanism 8 can be used with either option although it will first be described as used as a five speed transmission with a reverse speed.

The gears in the transmission 10 are changed by gear changing arms 18, 20, 22 which are mounted on the ends of stub shafts 24 which project from the housing 12. The gear changing arms are linked to the gear changing mechanism, in a manner described below, by control rods 26, 28, 30 as shown in FIG. 1.

Figure 6:
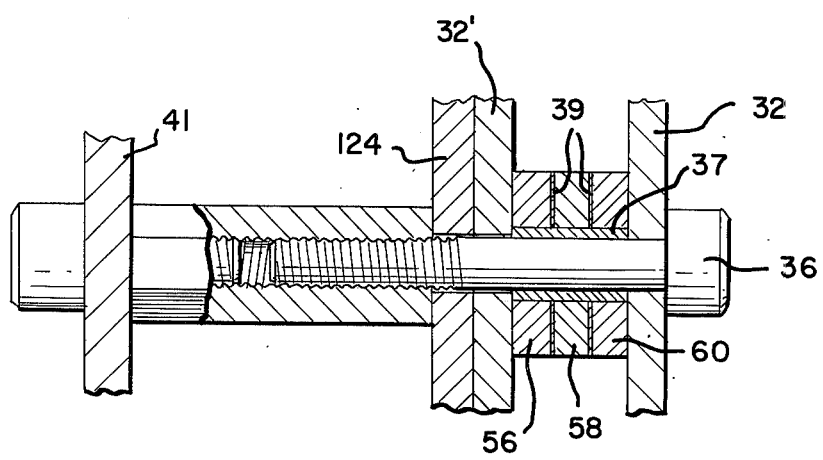
FIG. 6 is a view taken along the lines 6—6 of FIG. 2.

The gear shifting mechanism 8 comprises a pair of spaced apart identical cam plates 32, 32' which are held in spaced relationship by bolts 34, 36 which extend through holes 38, 40, 38', 40' in the plates 32, 32'. Advantageously, hardened steel sleeves as shown in FIG. 6 at 37 are mounted on the portions of the bolts which extend between the cam plates for the reason that the gear shift lever 102 and the control levers are rotatably mounted on the axes defined by the bolts.

Referring to FIG. 4, first, second and third control levers 42, 44, 46 respectively are contained between the opposed surfaces of the camming plates 32, 32' and are mounted by means of openings 48 on the sleeve 37 on bolt 36. These levers 42, 44, 46 have upwardly extending control arm portions 50, 52, 54 respectively and downwardly extended actuator arm portions 56, 68, 60 respectively. The actuator arm portions have holes 62 in their lower ends by means of which they are pivoted to the ends of the previously described control rods 26, 28, 30. As will become apparent as this description proceeds, the control levers 42, 44, 46 are selectively oscillated about the axis of bolt 36 thereby to move the control rods rightwardly and leftwardly as viewed in FIG. 1 and oscillate the arms 18, 20, 22 to change the gear ratios in the transmission. The actuator arm portions of the levers have offset end portions for clearance purpose as shown. Shims may be provided on sleeve 37 between the levers as shown in FIG. 6 at 39.

Control arm portion 50 of the lever 42 has an upper end 64 which is at a remote or maximum distance from a common axis 36 as compared to the upper ends 66, 68 of the second and third levers. The control arm portion 52 of the second lever 44 has an upper end 66 which is at an intermediate distance from this axis while the upper end 68 of control arm portion 54 of lever 46 is at a minimum or proximate distance with respect to the axis of bolt 36. These distances are important to the operation of the mechanism as will be described below. Control arm portion 50 of lever 42 is enlarged as shown and has a camming pin slot 70 which extends slightly arcuately downwardly as viewed in FIG. 4 and which communicates with an enlarged camming pin accommodation or clearance opening 72. This opening extends laterally in each direction and has a lower end defined by one of its edges 74 which is spaced from the axis 36 by the previously mentioned proximate distance. The second lever 44 also has an enlarged control arm portion and a slot 76 extends downwardly from its upper end 66 to a camming pin accommodation or clearance opening 78 which again, extends laterally in both directions from the lower end of slot 76. The lower end of opening 78 is defined by the edge 80 is also at substantially the previously mentioned proximate distance from the axis of bolt 36. A camming pin slot 82 also extends downwardly from the upper end 68 of the third lever 46 but an accommodation opening is not required at the inner end of this slot.

The levers 42, 44, 46 are selectively oscillated by means of a camming pin 84 which extends between, and beyond, the camming plates 32, 32' the axis of this camming pin being parallel to the axis of the bolt 36. The movement of the camming pin is determined by camming means on the camming plates 32, 32' this camming means on the two plates being identical so that a description of the camming means on the plate 32 will suffice for both plates.

A vertical slot 86 extends downwardly into the plate 32 from the upper edges thereof and the edge portions 88, 90 on each side of this slot serve as camming or guide surfaces for the camming pin 84. The edge portions 88 which are on the left of the slot as viewed in FIG. 4 are generally arcuate and are inclined generally upwardly towards the upper end of the slot 86. The edge portions 90 of plate 32 on the righthand side of slot 86 slope downwardly and towards the slot as shown clearly in FIG. 3. Immediately below these upper edges 88, 90 recesses extend laterally to the left and to the right as shown at 92, 94 from the slot 86. The leftwardly extending recess 92 is generally arcuate and is dimensioned to receive the camming pin as shown in FIG. 3. The rightwardly extending recess 94 has a lower edge 96 which, like the edge 90, is inclined downwardly towards the slot 86. Additional recesses 98, 100 extend leftwardly and rightwardly as viewed in FIGS. 3 and 4 from the inner end of slot 86, these recesses being dimensioned to receive the camming pin as also shown in FIG. 3.

The camming pin 84 is moved by a gear shift lever 102 which is pivotally mounted on the axis of pin 34 and which extends upwardly between the camming plates. Camming pin 84 is connected by parallel links 104 to the gear shift lever, these links being pivoted to the lever 102 as shown at 106 and having their other ends pivotally connected to the camming pin 84. It will thus be apparent that back and forth movement of the gear shift lever 102 will result in back and forth movement of the camming pin along an arcuate path.

The camming pin can be raised in the slots 86, 86' of the plates 32, 32' by a yoke 108 which has arms 110, 110' that are pivoted as shown at 112 to the links 104 at a location between the pin 106 and the camming pin 84. A rod 114 is secured to the yoke and extends upwardly beside the gear shift lever, and through an oversized opening in a guide 116 which extends from the gear shift lever. A handle 118 is mounted on the upper end of rod 114 and is conveniently located with respect to the handle 120 on the upper end of the gear shift lever. A spring 122 surrounds the portion of the rod which extends between the guide 116 and the yoke 108 and biases the rod 114 and the yoke 108 downwardly so that the camming pin is normally biased downwardly. It will be apparent that the proximity of the handles 118, 120 permits the driver to manipulate both the gear shift lever 102 and the control rod 114 if he is required to do so.

As shown in FIG. 3, the camming pin moves between limits which are defined by the inner ends of the recesses 92, 94, 98, 100 however, it is desirable to provide additional stops so that the camming pin will not be slammed against the inner ends of these recesses during shifting. Such additional stops are provided on a C-shaped stop mounting plate 124 which is welded or otherwise secured to the outwardly facing surface of camming surface 32'. Stop plates 126, 128 are secured to the arms of the mounting plate 124 and extend inwardly towards the camming plate 32. Bolts 130, 132 are threaded through these stop plates at locations such that the heads of the bolts are engaged by the actuator arm portions of the levers 42, 44, 46 as these levers are oscillated. The bolts can thus be adjusted so that the actuator arms will move against the heads of the bolts prior to movement of camming pin against the inner edge surfaces of the recesses 92, 94, 98, 100 of the camming plates 32, 32'.

The shifting mechanism can be mounted on, or adjacent to, the transmission housing in any suitable manner. FIG. 6 shows a mounting system in which the bolts 34, 36 may be threaded into spacer sleeves which in turn are bolted to a mounting plate 41. The mounting plate is secured to the transmission housing in any suitable manner.

As shown in FIG. 3, the shifting mechanism provides six positions numbered 1–6 in FIG. 3 and each position of the camming pin will provide a particular and distinct arrangement of the control arm portions 56, 58, 60 of the control levers. In turn, a particular position arrangement of the rods 26, 28, 30 is defined by the control arms and the arms 18, 20, 22 will thus be in precisely defined orientations. Ordinarily, the arms 18, 20, 22 will be connected by the rods 26, 28, 30 to the first, second, and third levers 42, 44, 46 such that position 1 in FIG. 3 will set the arms 18–22 for low or first gear, position 2 for second gear, position 3 for third gear, position 4, for fourth gear and position 5 for fifth gear. Position 6 would then be used for reverse and the transmission would be in neutral whenever the camming pin is in the slot 86.

In use, and assuming the linkages and arrangements discussed above are made, the driver will have the camming pin in position 1 when the race starts. After accelerating through first gear, he simply pulls the gear shift lever 102 rearwardly to position 2 to change to second gear. When the vehicle attains maximum second gear speed, he pushes gear shift lever 102 forwardly to move the camming pin into position 3. The spring 122 biases the camming pin downwardly so it follows the path indicated in FIG. 3 when it moves from position 2 to position 3. The gear changes to fourth and fifth gear are thus made in the same manner as the changes from first to second and from second to third as indicated by the lines in FIG. 3. Reverse gear is used in racing only prior to the start of the race in order to properly position the car.

Significant features of the invention are the provision of the second control lever 44 having the slot 76 which opens onto the upper end 66 of the lever and the accommodation opening 78 at its lower end and the provision of the enlarged clearance opening 72. It will, of course, be understood that when the camming pin is in slot 70 (positions 1 and 2) it will oscillate the lever 42 without effecting levers 44 and 46. When the pin is in slot 76, it will oscillate lever 44 but will not oscillate lever 42, (it will move in the clearance opening 72 without effecting the lever 42) and when the pin is in slot 82 of lever 46, it will oscillate the third lever but will move freely in the clearance openings 78, 72 so that it will not cause the first and second levers to oscillate.

In the descriptions presented above of the levers 42, 44, and 46 it is explained that the upper ends of these levers are substantially at maximum, intermediate, and minimum distances from the axis of the bolt 36. It will be understood that the maximum distance referred to is actually the distance between the axis of the bolt 36 and the lowermost surface of the camming pin 84 when it is in the slot 70 of the lever 42. Similarly, the intermediate distance referred to is the distance between the axis of the bolt and the camming pin when the camming pin is in the slot 76 and the minimum distance is, of course, the distance between the axis of the bolt and the lowermost surface of the camming pin when the camming pin is in the slot 82 of the lever 46. The upper ends of the levers 42, 44, 46 are actually spaced slightly beyond these maximum, intermediate, and minimum distances and those terms are used for convenience in describing the levers.

Figure 5:
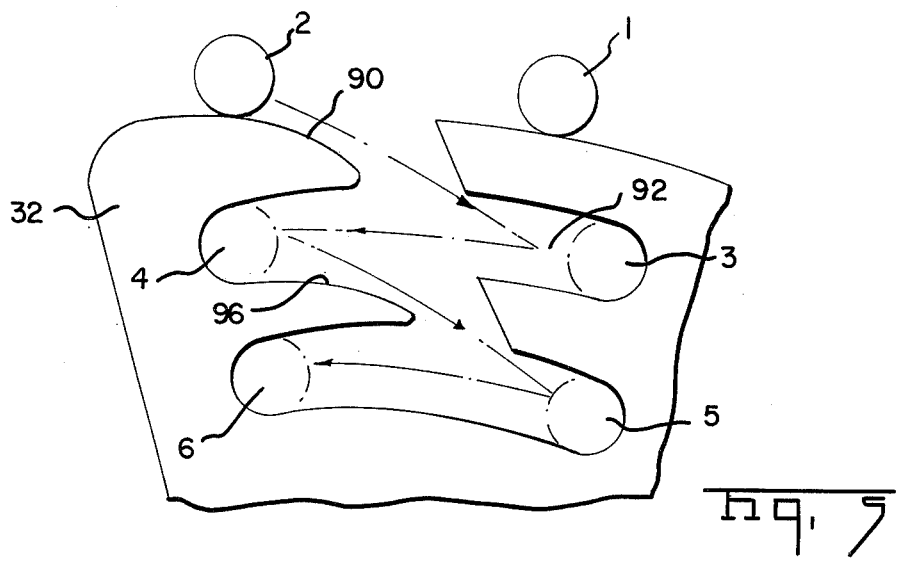
FIG. 5 is a view similar to FIG. 3 but showing an alternative orientation of the camming plate.

It will be apparent that an extremely rugged mechanism is thus provided which permits the driver to change gears rapidly in five speed transmission by imparting a simple, straight line motion to the gear shift lever. Under some circumstances, it may be desired to use the gear shift mechanism on a four speed transmission and if desired, the mechanism can be mounted on the transmission as shown in FIG. 1 and position 1 of FIG. 3 would not be utilized. In other words, the rods 26-30 and arms 18-22 would be connected so that position 2 would represent first gear, position 3 second gear, position 4, third gear, and position 5, fourth gear. Use of the mechanism in this manner is entirely feasible but may not be to the liking of some drivers who prefer to pull the gear shift lever back when going from first gear to second gear and to push it forwardly when going from second gear to third gear. If a driver prefers to have his gear shift mechanism thus arranged, his desires can be met by simply reversing the mechanism 8 on the transmission as shown in FIG. 5. With the camming plates 32, 32' reversed, position 2 is on the left as shown in FIG. 5 and if this position represents first gear, the change from first to second is brought about by pulling the gear shift machine backwardly towards the driver.

Advantageously, aligning pin holes 134 are provided in the camming plates 32, 32' and in each of the control levers 42, 44, 46. These aligning pin holes are used when the mechanism is being installed on the transmission and adjusted for a particular transmission. The three levers can be precisely aligned with each other and with the camming plates by inserting an aligning pin through the holes. The final adjustments can then be made to the transmission control arms 18-22 and the stops while the levers are thus held. The aligning pin is, of course, removed prior to use of the vehicle. As noted previously, the disclosed form of the invention is particularly intended for racing and it is not convenient to downshift with the embodiment shown, that is, to go from position 5 to position 4 or from position 3 to position 2. The disclosed embodiment can be adapted for street use by modifying the rod 114 to provide a ratchet type mechanism on the rod so that it can be lifted during downshifting from position 5 to 4 and from 3 to 2. To downshift from position 5 to position 4, the rod would be lifted by handle 118 while the gear shift lever was being pulled rearwardly. The ratchet mechanism would hold the camming pin 84 at an elevation such that it would move over the edges 96, 96' of the camming plates. Downshifting from position 4 to position 3 merely requires that the gear shift mechanism 102 be moved forwardly and the ratchet mechanism would hold the camming pin such that it would move into the recess 92. Downshifting from position 3 to position 2 could be accomplished by providing a second stage in the ratchet mechanism. If modified in this manner, the disclosed embodiment could be used on a vehicle intended for over the road travel.

What is claimed is:

1. A gear changing mechanism intended for use on an automative transmission having at least four forward speeds and a reverse speed, said mechanism comprising:

a first, second, and third speed change levers, said levers being pivotally mounted intermediate their ends on a common axis means, each of said levers having an actuator arm portion and a control arm portion, said control arm portions extending in one common direction from said axis, said actuator arm portions extending in another direction from said common axis, said control arm portion of said first lever having a free end which is at a maximum distance from said common axis, said control arm portion of said second lever having a free end which is at an intermediate distance from said common axis, and said control arm portion of said third lever having a free end which is at a minimum distance from said common axis, a first lever camming pin slot extending in said control arm portion of said first lever, a second lever camming pin slot extending inwardly from said free end of said second lever, a third lever camming pin slot extending inwardly from said free end of said third lever, said slots extending towards said common axis, a first lever clearance opening in said control arm portion of said first lever, said first lever camming pin slot extending to said first lever clearance opening, said first lever clearance opening extending laterally in both directions from said camming pin slot and extending towards said common axis to substantially said minimum distance, a second lever clearance opening in said control arm portion of said second lever, said second lever camming pin slot extending to said second lever clearance opening, said second lever clearance opening extending towards said common axis to substantially said minimum distance and extending laterally in both directions, a camming pin extending parallel to said common axis, static camming means for guiding said camming pin along a path extending from a first location in said first lever camming pin slot to a second location in said second lever camming pin slot and to a third location in said third lever camming pin slot, said camming means also having means for guiding said pin laterally in both directions when said pin is in any one of said locations, and manually controllable gear shift lever means for moving said camming pin whereby, upon mounting said mechanism proximate to a transmission and connecting control means of said transmission to said actuator arm portions of said levers, the gear ratios in said transmission can be rapidly changed upon manipulation of said gear shift lever means.

2. A gear changing mechanism as set forth in claim 1, said static camming means comprising a pair of identical spaced-apart camming plates, said speed change levers being pivotally mounted between said camming plates.

3. A gear changing mechanism as set forth in claim 2, each of said camming plates having a slot for guiding said camming pin along said path, said slots being in alignment, said means for guiding said pin laterally comprising recesses extending laterally from said slots.

4. A gear changing mechanism as set forth in claim 3, said first lever camming pin slot being an enclosed slot.

5. A gear changing mechanism intended for use on an automative transmission having at least four forward speeds and a reverse speed, said mechanism comprising:

a pair of camming plates, said plates being in spaced-apart parallel aligned relationship to each other, first, second, and third speed change levers between said camming plates, said levers being pivotally mounted intermediate their ends on a common axis means which extends between said camming plates, each of said levers having an actuator arm portion and a control arm portion, said control arm portions extending in one common direction from said axis and being between said camming plates, said actuator arm portions extending in another direction from said common axis, said control arm portion of said first lever having a free end which is at a maximum distance from said common axis, said control arm portion of said second lever having a free end which is at an intermediate distance from said common axis, and said control arm portion of said third lever having a free end which is at a minimum distance from said common axis, a third lever camming pin slot extending inwardly from said free end of said control arm portion of said third lever, a second lever camming pin slot extending inwardly from said free end of said control arm portion of said second lever, said second lever slot having an inner end which is in alignment with the inner end of said third lever slot, camming pin clearance openings extending laterally in both directions from said inner end of said second lever slot, a first lever camming pin slot in said control arm portions of said first lever, a first lever camming pin clearance opening in said control arm portion of said first lever, said first lever slot communicating with said first lever opening, said first lever opening extending laterally in both directions and extending towards said common axis to substantially said minimum distance, a camming pin extending between said camming plates parallel to said common axis, static camming means on said camming plates for guiding said camming pin, under manual control, between said first lever camming pin slot through said second lever camming pin slot and into said third lever camming pin slot, said static camming means having camming portions permitting movement of said pin laterally in each direction while said pin is in any one of said camming pin slots, shift lever means pivotally mounted on said cam plates on an axis extending parallel to said fixed axis, and linkage means extending from said shift lever means for moving said camming pin within the limits defined by said static camming means whereby, upon mounting said mechanism of proximate to a transmission and connecting control means of said transmission to said actuator arm portions of said levers, the gear ratios in said transmission can be rapidly changed upon to and fro manipulation of said gear shift lever.

6. A gear changing mechanism as set forth in claim 5, said linkage means comprising connecting links extending from said gear shift lever to said camming pin.

7. A gear changing mechanism as set forth in claim 6, a camming pin lifting rod extending beside said gear shift lever for lifting said camming pin away from said common axis, and resilient means biasing said camming pin towards said common axis.

8. A gear changing mechanism as set forth in claim 5 having adjustable stop means for said actuator arm portions of said levers.

9. A gear changing mechanism intended for use on an automotive transmission having at least four forward speeds and a reverse speed, said mechanism comprising:

a pair of cam plates, said cam plates being in spaced apart parallel, aligned relationship to each other, first, second, and third speed change levers between said cam plates, said levers being pivotally mounted intermediate their ends on a common axis means which extends between said cam plates, each of said levers having an actuator arm portion and a control arm portion, said control arm portions extending in one common general direction from said common axis and said actuator arm portions extending in another common general direction from said common axis, said control arm portions of said first, second, and third levers having free end portions which are located respectively at a maximum distance, an intermediate distance, and a minimum distance from said common axis, said control arm portion of said first lever having a camming pin slot extending from substantially its free end generally towards said common axis to said intermediate distance, a camming pin clearance opening in said control arm portion of said first lever extending from said intermediate distances towards said common axis to said minimum distance and extending laterally in two directions, said control arm portion of said second lever having a second lever camming pin slot extending inwardly from the free end thereof towards said common axis to said minimum distance, said slot communicating with a second lever camming pin clearance opening which extends laterally in both directions, said control arm portion of said third lever having a third lever camming pin slot extending towards said common axis from its free end, a camming pin extending between said camming plates parallel to said common axis, static camming means on said camming plates for guiding said camming pin from said first lever camming slot into said second lever camming slot, and from said second lever camming slot to said third lever camming slot, said static camming means permitting movement of said camming pin laterally with respect to said camming pin slots when said camming pin is in any one of said camming pin slots, shift lever means pivotally mounted on a shift lever axis which extends parallel to said common axis, and linkage means extending between said shift lever means and said camming pin for moving said camming pin within the limits defined by said static camming means.

* * * * *